US00RE45327E

(19) United States
(12) Reissued Patent
Bowers et al.

(10) Patent Number: US RE45,327 E
(45) Date of Reissued Patent: Jan. 6, 2015

(54) APPARATUS, SYSTEMS AND METHODS TO PROVIDE AUTHENTICATION SERVICES TO A LEGACY APPLICATION

(71) Applicant: Quest Software, Inc., Aliso Viejo, CA (US)

(72) Inventors: John Joseph Bowers, Provo, UT (US); Matthew T Peterson, Lindon, UT (US)

(73) Assignee: Dell Software, Inc., Aliso Viejo, CA (US)

(21) Appl. No.: 13/789,529

(22) Filed: Mar. 7, 2013

Related U.S. Patent Documents

Reissue of:
(64) Patent No.: 7,904,949
Issued: Mar. 8, 2011
Appl. No.: 11/311,215
Filed: Dec. 19, 2005

(51) Int. Cl.
*G06F 21/00* (2013.01)
*H04L 29/06* (2006.01)

(52) U.S. Cl.
USPC ..... 726/10; 726/27; 713/155; 713/168; 380/29; 380/255; 380/277

(58) Field of Classification Search
None
See application file for complete search history.

(56) References Cited

U.S. PATENT DOCUMENTS

| | | | |
|---|---|---|---|
| 4,109,237 | A | 8/1978 | Hill |
| 4,370,707 | A | 1/1983 | Phillips et al. |
| 4,694,397 | A | 9/1987 | Grant et al. |
| 5,222,018 | A | 6/1993 | Sharpe et al. |
| 5,267,865 | A | 12/1993 | Lee et al. |
| 5,302,132 | A | 4/1994 | Corder |
| 5,310,349 | A | 5/1994 | Daniels et al. |
| 5,313,465 | A | 5/1994 | Perlman et al. |
| 5,333,302 | A | 7/1994 | Hensley et al. |
| 5,339,435 | A | 8/1994 | Lubkin et al. |
| 5,367,698 | A | 11/1994 | Webber et al. |
| 5,371,852 | A | 12/1994 | Attanasio et al. |
| 5,387,104 | A | 2/1995 | Corder |
| 5,410,703 | A | 4/1995 | Nilsson et al. |
| 5,423,032 | A | 6/1995 | Byrd et al. |

(Continued)

FOREIGN PATENT DOCUMENTS

| | | |
|---|---|---|
| EP | 05728119.1 | 3/2005 |
| JP | 1 932 279 A2 | 6/2008 |
| WO | WO 2006/016900 | 2/2006 |
| WO | WO 2007/044613 | 4/2007 |

OTHER PUBLICATIONS

U.S. Appl. No. 12/200,814, filed Aug. 28, 2008, Eyes et al.

(Continued)

*Primary Examiner* — Lisa Lewis
(74) *Attorney, Agent, or Firm* — Knobbe Martens Olson & Bear LLP

(57) ABSTRACT

Authentication credentials from legacy applications are translated to Kerberos authentication requests. Authentication credentials from the legacy application are directed to an authentication proxy module. The authentication proxy module acts as a credential translator for the application by receiving a set of credentials such as a user name and password, then managing the process of authenticating to a Kerberos server and obtaining services from one or more Kerberized applications, including Kerberos session encryption. A credential binding module associates a user corresponding to authentication credentials from a legacy authentication protocol with one or more Kerberos credentials. Anonymous authentication credentials may be translated to authentication requests for a network directory services object, such as a computer object or service object.

21 Claims, 4 Drawing Sheets

(56) References Cited

U.S. PATENT DOCUMENTS 5,437,027 A 7/1995 Bannon et al.
5,437,555 A 8/1995 Ziv-El
5,440,719 A 8/1995 Hanes et al.
5,441,415 A 8/1995 Lee et al.
5,497,486 A 3/1996 Stolfo et al.
5,497,492 A 3/1996 Zbikowski et al.
5,499,379 A 3/1996 Tanaka et al.
5,530,829 A 6/1996 Beardsley et al.
5,550,968 A 8/1996 Miller et al.
5,550,976 A 8/1996 Henderson et al.
5,553,291 A 9/1996 Tanaka et al.
5,586,304 A 12/1996 Stupek, Jr. et al.
5,590,360 A 12/1996 Edwards
5,600,833 A 2/1997 Senn et al.
5,608,874 A 3/1997 Ogawa et al.
5,608,903 A 3/1997 Prasad et al.
5,613,090 A 3/1997 Willems
5,623,601 A 4/1997 Vu
5,630,069 A 5/1997 Flores et al.
5,630,131 A 5/1997 Palevich et al.
5,659,735 A 8/1997 Parrish et al.
5,659,736 A 8/1997 Hasegawa et al.
5,666,502 A 9/1997 Capps
5,671,428 A 9/1997 Muranaga et al.
5,673,386 A 9/1997 Batra
5,673,387 A 9/1997 Chen et al.
5,675,782 A 10/1997 Montague et al.
5,677,997 A 10/1997 Talatik
5,680,586 A 10/1997 Elkins et al.
5,684,950 A 11/1997 Dare et al.
5,692,132 A 11/1997 Hogan
5,692,902 A 12/1997 Aeby
5,694,540 A 12/1997 Humelsine et al.
5,706,502 A 1/1998 Foley et al.
5,708,812 A 1/1998 Van Dyke et al.
5,708,828 A 1/1998 Coleman
5,710,884 A 1/1998 Dedrick
5,711,671 A 1/1998 Geeslin et al.
5,724,521 A 3/1998 Dedrick
5,727,145 A 3/1998 Nessett et al.
5,727,951 A 3/1998 Ho et al.
5,740,427 A 4/1998 Stoller
5,743,746 A 4/1998 Ho et al.
5,745,113 A 4/1998 Jordan et al.
5,745,902 A 4/1998 Miller et al.
5,752,042 A 5/1998 Cole et al.
5,754,173 A 5/1998 Hiura et al.
5,754,938 A 5/1998 Herz et al.
5,758,062 A 5/1998 McMahon et al.
5,758,074 A 5/1998 Marlin et al.
5,758,344 A 5/1998 Prasad et al.
5,764,897 A 6/1998 Khalidi
5,765,140 A 6/1998 Knudson et al.
5,768,519 A 6/1998 Swift et al.
5,774,551 A 6/1998 Wu et al.
5,778,169 A 7/1998 Reinhardt
5,784,553 A 7/1998 Kolawa et al.
5,784,643 A 7/1998 Shields
5,790,801 A 8/1998 Funato
5,796,393 A 8/1998 MacNaughton et al.
5,806,075 A 9/1998 Jain et al.
5,812,669 A 9/1998 Jenkins et al.
5,812,865 A 9/1998 Theimer et al.
5,815,657 A 9/1998 Williams et al.
5,819,265 A 10/1998 Ravin et al.
5,819,281 A 10/1998 Cummins
5,819,295 A 10/1998 Nakagawa et al.
5,822,518 A 10/1998 Ooki et al.
5,835,087 A 11/1998 Herz et al.
5,835,911 A 11/1998 Nakagawa et al.
5,838,918 A 11/1998 Prager et al.
5,844,508 A 12/1998 Murashita et al.
5,848,396 A 12/1998 Gerace
5,859,972 A 1/1999 Subramaniam et al.
5,872,928 A 2/1999 Lewis et al.
5,872,973 A 2/1999 Mitchell et al.
5,878,432 A 3/1999 Misheski et al.
5,889,520 A 3/1999 Glaser
5,890,161 A 3/1999 Helland et al.
5,890,175 A 3/1999 Wong et al.
5,892,898 A 4/1999 Fujii et al.
5,893,074 A 4/1999 Hughes et al.
5,893,076 A 4/1999 Hafner et al.
5,893,916 A 4/1999 Dooley
5,930,512 A 7/1999 Boden et al.
5,937,165 A 8/1999 Schwaller et al.
5,948,064 A 9/1999 Bertram et al.
5,949,419 A 9/1999 Domine et al.
5,956,732 A 9/1999 Tsuchida
5,956,736 A 9/1999 Hanson et al.
5,960,200 A 9/1999 Eager et al.
5,968,176 A 10/1999 Nessett et al.
5,987,247 A 11/1999 Lau
5,995,114 A 11/1999 Wegman et al.
6,002,868 A 12/1999 Jenkins et al.
6,003,047 A 12/1999 Osmond et al.
6,014,669 A 1/2000 Slaughter et al.
6,014,712 A 1/2000 Islam et al.
6,016,495 A 1/2000 McKeehan et al.
6,016,501 A 1/2000 Martin et al.
6,021,496 A 2/2000 Dutcher et al.
6,029,178 A 2/2000 Martin et al.
6,029,195 A 2/2000 Herz
6,029,247 A 2/2000 Ferguson
6,035,323 A 3/2000 Narayen et al.
6,041,344 A 3/2000 Bodamer et al.
6,044,368 A 3/2000 Powers
6,044,465 A 3/2000 Dutcher et al.
6,049,822 A 4/2000 Mittal
6,052,512 A 4/2000 Peterson et al.
6,055,538 A 4/2000 Kessenich et al.
6,058,260 A 5/2000 Brockel et al.
6,058,379 A 5/2000 Odom et al.
6,061,643 A 5/2000 Walker et al.
6,061,650 A 5/2000 Malking et al.
6,067,568 A 5/2000 Li et al.
6,070,184 A 5/2000 Blount et al.
6,076,166 A 6/2000 Moshfeghi et al.
6,079,020 A 6/2000 Liu
6,092,199 A 7/2000 Dutcher et al.
6,101,481 A 8/2000 Miller
6,101,503 A 8/2000 Cooper et al.
6,108,649 A 8/2000 Young et al.
6,108,670 A 8/2000 Weida et al.
6,112,228 A 8/2000 Earl et al.
6,112,240 A 8/2000 Pogue et al.
6,115,040 A 9/2000 Bladow et al.
6,115,544 A 9/2000 Mueller
6,134,548 A 10/2000 Gottsman et al.
6,137,869 A 10/2000 Voit et al.
6,138,086 A 10/2000 Rose et al.
6,141,006 A 10/2000 Knowlton et al.
6,141,010 A 10/2000 Hoyle
6,141,647 A 10/2000 Meijer et al.
6,151,600 A 11/2000 Dedrick
6,151,610 A 11/2000 Senn et al.
6,161,176 A 12/2000 Hunter et al.
6,167,445 A 12/2000 Gai et al.
6,167,564 A 12/2000 Fontana et al.
6,170,009 B1 1/2001 Mandal et al.
6,182,212 B1 1/2001 Atkins et al.
6,182,226 B1 1/2001 Reid et al.
6,185,625 B1 2/2001 Tso et al.
6,195,794 B1 2/2001 Buxton
6,199,068 B1 3/2001 Carpenter
6,199,079 B1 3/2001 Gupta et al.
6,202,051 B1 3/2001 Woolston
6,205,480 B1 3/2001 Broadhurst et al.
6,208,345 B1 3/2001 Sheard et al.
6,209,000 B1 3/2001 Klein et al.
6,209,033 B1 3/2001 Datta et al.
6,222,535 B1 4/2001 Hurd, II
6,223,221 B1 4/2001 Kunz
6,226,649 B1 5/2001 Bodamer et al.

(56) References Cited

U.S. PATENT DOCUMENTS 6,230,160 B1 5/2001 Chan et al.
6,230,194 B1 5/2001 Frailong et al.
6,230,309 B1 5/2001 Turner et al.
6,233,584 B1 5/2001 Purcell
6,237,114 B1 5/2001 Wookey et al.
6,246,410 B1 6/2001 Bergeron et al.
6,249,905 B1 6/2001 Yoshida et al.
6,256,637 B1 7/2001 Venkatesh et al.
6,256,659 B1 7/2001 McLain, Jr. et al.
6,256,678 B1 7/2001 Traughber et al.
6,260,068 B1 7/2001 Zalewski et al.
6,263,352 B1 7/2001 Cohen
6,266,666 B1 7/2001 Ireland et al.
6,269,405 B1 7/2001 Dutcher et al.
6,269,406 B1 7/2001 Dutcher et al.
6,272,673 B1 8/2001 Dale et al.
6,272,678 B1 8/2001 Imachi et al.
6,279,030 B1 8/2001 Britton et al.
6,282,576 B1 8/2001 Lane
6,282,605 B1 8/2001 Moore
6,286,028 B1 9/2001 Cohen et al.
6,286,104 B1 9/2001 Buhle et al.
6,301,601 B1 10/2001 Helland et al.
6,304,893 B1 10/2001 Gish
6,308,164 B1 10/2001 Nummelin et al.
6,308,188 B1 10/2001 Bernardo et al.
6,308,273 B1 10/2001 Goertzel et al.
6,313,835 B1 11/2001 Gever et al.
6,314,434 B1 11/2001 Shigemi et al.
6,327,677 B1 12/2001 Garg et al.
6,330,566 B1 12/2001 Durham
6,336,118 B1 1/2002 Hammond
6,341,287 B1 1/2002 Sziklai et al.
6,345,239 B1 2/2002 Bowman-Amuah
6,349,287 B1 2/2002 Hayashi
6,363,398 B1 3/2002 Andersen
6,370,573 B1 4/2002 Bowman-Amuah
6,370,646 B1 4/2002 Goodman et al.
6,381,579 B1 4/2002 Gervais et al.
6,389,589 B1 5/2002 Mishra et al.
6,401,085 B1 6/2002 Gershman et al.
6,401,211 B1 6/2002 Brezak et al.
6,405,364 B1 6/2002 Bowman-Amuah
6,430,556 B1 8/2002 Goldberg et al.
6,438,514 B1 8/2002 Hill et al.
6,442,620 B1 8/2002 Thatte et al.
6,446,096 B1 9/2002 Holland et al.
6,453,317 B1 9/2002 LaCost et al.
6,457,130 B2 9/2002 Hitz et al.
6,466,932 B1 10/2002 Dennis et al.
6,469,713 B2 10/2002 Hetherington et al.
6,473,794 B1 10/2002 Guheen et al.
6,496,847 B1 12/2002 Bugnion et al.
6,567,818 B1 5/2003 Frey et al.
6,587,876 B1 7/2003 Mahon et al.
6,615,258 B1 9/2003 Barry et al.
6,625,622 B1 9/2003 Henrickson et al.
6,658,625 B1 12/2003 Allen
6,678,714 B1 1/2004 Olapurath et al.
6,715,128 B1 3/2004 Hirashima et al.
6,728,877 B2 4/2004 Mackin et al.
6,735,691 B1 5/2004 Capps et al.
6,757,696 B2 6/2004 Multer et al.
6,760,761 B1 7/2004 Sciacca
6,795,835 B2 9/2004 Ricart et al.
6,801,946 B1 10/2004 Child et al.
6,817,017 B2 11/2004 Goodman
6,839,766 B1 1/2005 Parnafes et al.
6,880,005 B1 4/2005 Bell et al.
6,925,477 B1 8/2005 Champagne et al.
6,938,158 B2 8/2005 Azuma
6,941,465 B1 9/2005 Palekar et al.
6,944,183 B1 9/2005 Iyer et al.
6,950,818 B2 9/2005 Dennis et al.
6,950,935 B1 9/2005 Allavarpu et al.
6,968,370 B2 11/2005 Wu
6,973,488 B1 12/2005 Yavatkar et al.
6,976,090 B2 12/2005 Ben-Shaul et al.
7,028,079 B2 4/2006 Mastrianni et al.
7,062,781 B2 6/2006 Shambroom
7,080,077 B2 7/2006 Ramamurthy et al.
7,089,584 B1 * 8/2006 Sharma ..... 726/4
7,100,195 B1 8/2006 Underwood
7,117,486 B2 10/2006 Wong et al.
7,133,984 B1 11/2006 Dickensheets
7,139,973 B1 11/2006 Kirkwood et al.
7,143,095 B2 11/2006 Barrett et al.
7,162,640 B2 1/2007 Heath et al.
7,171,458 B2 1/2007 Brown et al.
7,185,073 B1 2/2007 Gai et al.
7,209,970 B1 4/2007 Everson et al.
7,213,266 B1 5/2007 Maher et al.
7,216,181 B1 5/2007 Jannu et al.
7,231,460 B2 6/2007 Sullivan et al.
7,234,157 B2 6/2007 Childs et al.
7,243,370 B2 7/2007 Bobde et al.
7,284,043 B2 10/2007 Feinleib et al.
7,299,504 B1 11/2007 Tiller et al.
7,346,766 B2 3/2008 Mackin et al.
7,356,601 B1 4/2008 Clymer et al.
7,356,816 B2 4/2008 Goodman et al.
7,379,996 B2 5/2008 Papatla et al.
7,418,597 B2 8/2008 Thornton et al.
7,421,555 B2 9/2008 Dorey
7,426,642 B2 9/2008 Aupperle et al.
7,428,583 B1 9/2008 Lortz et al.
7,440,962 B1 10/2008 Wong et al.
7,444,401 B1 10/2008 Keyghobad et al.
7,467,141 B1 12/2008 Steele et al.
7,478,418 B2 1/2009 Supramaniam et al.
7,483,979 B1 1/2009 Prager
7,487,535 B1 2/2009 Isaacson et al.
7,519,813 B1 4/2009 Cox et al.
7,584,502 B2 9/2009 Alkove et al.
7,591,005 B1 9/2009 Moore
7,617,501 B2 11/2009 Peterson
7,650,497 B2 1/2010 Thornton et al.
7,653,794 B2 1/2010 Michael et al.
7,661,027 B2 2/2010 Langen et al.
7,673,323 B1 3/2010 Moriconi
7,690,025 B2 3/2010 Grewal et al.
7,765,187 B2 7/2010 Bergant et al.
7,805,721 B2 9/2010 Feinleib et al.
7,895,332 B2 2/2011 Vanyukhin et al.
7,904,949 B2 3/2011 Bowers et al.
7,987,455 B1 7/2011 Senner et al.
8,024,360 B2 9/2011 Moore
8,086,710 B2 12/2011 Vanyukhin et al.
8,087,075 B2 12/2011 Peterson et al.
8,141,138 B2 3/2012 Bhatia et al.
8,245,242 B2 8/2012 Peterson et al.
8,346,908 B1 1/2013 Vanyukhin et al.
8,429,712 B2 4/2013 Robinson et al.
8,533,744 B2 9/2013 Peterson et al.
8,584,218 B2 11/2013 Peterson et al.
2001/0034733 A1 10/2001 Prompt et al.
2002/0055949 A1 5/2002 Shiomi et al.
2002/0078005 A1 6/2002 Shi et al.
2002/0112178 A1 8/2002 Scherr
2002/0129274 A1 9/2002 Baskey et al.
2002/0133723 A1 9/2002 Tait
2002/0138572 A1 9/2002 Delany et al.
2002/0169986 A1 11/2002 Lortz
2002/0169988 A1 11/2002 Vandergeest et al.
2002/0174366 A1 11/2002 Peterka et al.
2002/0178377 A1 * 11/2002 Hemsath et al. ..... 713/201
2002/0184536 A1 12/2002 Flavin
2003/0009487 A1 1/2003 Prabakaran et al.
2003/0018913 A1 1/2003 Brezak et al.
2003/0023587 A1 1/2003 Dennis et al.
2003/0028611 A1 2/2003 Kenny et al.
2003/0033535 A1 2/2003 Fisher et al.
2003/0065940 A1 * 4/2003 Brezak et al. ..... 713/201
2003/0065942 A1 4/2003 Lineman et al.

(56) References Cited

U.S. PATENT DOCUMENTS

| | | | | |
|---|---|---|---|---|
| 2003/0110397 | A1 | 6/2003 | Supramaniam et al. | |
| 2003/0115186 | A1 | 6/2003 | Wilkinson et al. | |
| 2003/0115313 | A1 | 6/2003 | Kanada et al. | |
| 2003/0115439 | A1 | 6/2003 | Mahalingam et al. | |
| 2003/0149781 | A1 | 8/2003 | Yared et al. | |
| 2003/0177388 | A1 | 9/2003 | Botz et al. | |
| 2003/0188036 | A1 | 10/2003 | Chen et al. | |
| 2003/0226036 | A1* | 12/2003 | Bivens et al. | 713/201 |
| 2003/0229783 | A1 | 12/2003 | Hardt | |
| 2004/0010519 | A1 | 1/2004 | Sinn et al. | |
| 2004/0059953 | A1 | 3/2004 | Purnell | |
| 2004/0078569 | A1 | 4/2004 | Hotti | |
| 2004/0088543 | A1 | 5/2004 | Garg et al. | |
| 2004/0098595 | A1 | 5/2004 | Aupperle et al. | |
| 2004/0098615 | A1 | 5/2004 | Mowers et al. | |
| 2004/0111515 | A1 | 6/2004 | Manion et al. | |
| 2004/0111643 | A1 | 6/2004 | Farmer | |
| 2004/0117382 | A1 | 6/2004 | Houseknecht et al. | |
| 2004/0123146 | A1 | 6/2004 | Himmel et al. | |
| 2004/0128506 | A1* | 7/2004 | Blakley et al. | 713/170 |
| 2004/0128541 | A1* | 7/2004 | Blakley et al. | 713/201 |
| 2004/0128542 | A1* | 7/2004 | Blakley et al. | 713/201 |
| 2004/0139050 | A1 | 7/2004 | Barrett et al. | |
| 2004/0139081 | A1 | 7/2004 | Barrett et al. | |
| 2004/0199795 | A1 | 10/2004 | Grewal et al. | |
| 2004/0226027 | A1 | 11/2004 | Winter | |
| 2004/0260565 | A1 | 12/2004 | Zimniewicz et al. | |
| 2004/0260651 | A1 | 12/2004 | Chan et al. | |
| 2005/0010547 | A1 | 1/2005 | Carinci et al. | |
| 2005/0044409 | A1 | 2/2005 | Betz et al. | |
| 2005/0055357 | A1 | 3/2005 | Campbell | |
| 2005/0060397 | A1 | 3/2005 | Barthram et al. | |
| 2005/0086457 | A1 | 4/2005 | Hohman | |
| 2005/0091068 | A1 | 4/2005 | Ramamoorthy et al. | |
| 2005/0091213 | A1 | 4/2005 | Schutz et al. | |
| 2005/0091250 | A1 | 4/2005 | Dunn et al. | |
| 2005/0091284 | A1 | 4/2005 | Weissman et al. | |
| 2005/0091290 | A1 | 4/2005 | Cameron et al. | |
| 2005/0108579 | A1 | 5/2005 | Isaacson et al. | |
| 2005/0114701 | A1 | 5/2005 | Atkins et al. | |
| 2005/0125798 | A1 | 6/2005 | Peterson | |
| 2005/0144463 | A1 | 6/2005 | Rossebo et al. | |
| 2005/0193181 | A1 | 9/2005 | Kaneda et al. | |
| 2005/0198303 | A1 | 9/2005 | Knauerhase et al. | |
| 2005/0204143 | A1 | 9/2005 | Ellington | |
| 2005/0223216 | A1 | 10/2005 | Chan et al. | |
| 2005/0246554 | A1 | 11/2005 | Batson | |
| 2005/0267938 | A1 | 12/2005 | Czeczulin | |
| 2005/0268309 | A1 | 12/2005 | Krishnaswamy et al. | |
| 2005/0283443 | A1 | 12/2005 | Hardt | |
| 2005/0283614 | A1 | 12/2005 | Hardt | |
| 2006/0004794 | A1 | 1/2006 | Pizzo et al. | |
| 2006/0005229 | A1 | 1/2006 | Palekar et al. | |
| 2006/0010445 | A1 | 1/2006 | Peterson et al. | |
| 2006/0015353 | A1 | 1/2006 | Reese | |
| 2006/0021017 | A1* | 1/2006 | Hinton et al. | 726/10 |
| 2006/0026195 | A1 | 2/2006 | Gu et al. | |
| 2006/0034494 | A1 | 2/2006 | Holloran | |
| 2006/0085483 | A1 | 4/2006 | Mooney et al. | |
| 2006/0116949 | A1 | 6/2006 | Wehunt et al. | |
| 2006/0130065 | A1 | 6/2006 | Chin et al. | |
| 2006/0161435 | A1 | 7/2006 | Atef et al. | |
| 2006/0174350 | A1 | 8/2006 | Roever et al. | |
| 2006/0184401 | A1 | 8/2006 | DelGaudio et al. | |
| 2006/0200424 | A1 | 9/2006 | Cameron et al. | |
| 2006/0200504 | A1 | 9/2006 | Lo | |
| 2006/0224611 | A1 | 10/2006 | Dunn et al. | |
| 2006/0248099 | A1 | 11/2006 | Barrett et al. | |
| 2006/0265740 | A1 | 11/2006 | Clark et al. | |
| 2006/0282360 | A1 | 12/2006 | Kahn et al. | |
| 2006/0282461 | A1 | 12/2006 | Marinescu | |
| 2006/0294151 | A1 | 12/2006 | Wong et al. | |
| 2007/0011136 | A1 | 1/2007 | Haskin et al. | |
| 2007/0038596 | A1 | 2/2007 | Pizzo et al. | |
| 2007/0083917 | A1 | 4/2007 | Peterson et al. | |
| 2007/0100980 | A1 | 5/2007 | Kataoka et al. | |
| 2007/0101415 | A1 | 5/2007 | Masui | |
| 2007/0143430 | A1 | 6/2007 | Johnson et al. | |
| 2007/0143836 | A1 | 6/2007 | Bowers et al. | |
| 2007/0150448 | A1 | 6/2007 | Patnode | |
| 2007/0156766 | A1 | 7/2007 | Hoang et al. | |
| 2007/0156767 | A1 | 7/2007 | Hoang et al. | |
| 2007/0180448 | A1 | 8/2007 | Low et al. | |
| 2007/0180493 | A1 | 8/2007 | Croft et al. | |
| 2007/0192843 | A1 | 8/2007 | Peterson et al. | |
| 2007/0255814 | A1 | 11/2007 | Green et al. | |
| 2007/0288992 | A1 | 12/2007 | Robinson et al. | |
| 2008/0104220 | A1 | 5/2008 | Vanyukhin et al. | |
| 2008/0104250 | A1 | 5/2008 | Vanyukhin et al. | |
| 2008/0133533 | A1 | 6/2008 | Ganugapati et al. | |
| 2008/0162604 | A1 | 7/2008 | Soulet et al. | |
| 2008/0215867 | A1 | 9/2008 | Mackin et al. | |
| 2009/0006537 | A1 | 1/2009 | Palekar et al. | |
| 2009/0216975 | A1 | 8/2009 | Halperin et al. | |
| 2010/0050232 | A1 | 2/2010 | Peterson et al. | |
| 2011/0093570 | A1 | 4/2011 | Mackin et al. | |
| 2011/0282977 | A1 | 11/2011 | Peterson | |
| 2011/0283273 | A1 | 11/2011 | Peterson | |
| 2012/0192256 | A1 | 7/2012 | Peterson et al. | |
| 2012/0215899 | A1 | 8/2012 | Peterson | |
| 2012/0297035 | A1 | 11/2012 | Peterson | |

OTHER PUBLICATIONS

"Description of Digital Certificates", Jan. 23, 2007, http://www.support.microsoft.com/kb/195724.

"Directory Administrator", http://diradmin.open-it.org/indexlphp, p. 1-3. Dec. 15, 2004.

"Innovation Report—Windows Group Policy Protocols". Jul. 31, 2006.

"Kerberos Module for Apache", http://modauthkerb.sourceforge.net/.

"LDAP Linux HOWTO", http://tldp/org/HOWTO/LDAP-HOWTO/, p. 1-2. Mar. 5, 2004.

"Lnux Authentication Against Active Directory", http://laaad/sourceforge.netlen/home/htm, p. 1-2. Dec. 15, 2004.

"NegotiateAuth", http://negotiateauth,mozdev.org/ Jul. 8, 2010.

"Optimization Techniques for Trusted Semantic Interoperation", Final Technical Report, Air Force Research Laboratory. Published May 1998.

"Project: AD4Unix: Summary", http://sourceforge.netlprojects/adunixl, p. 1-3. Dec. 15, 2004.

"Replacing NIS with Kerberos and LDAP", http://ofb.netHhess/krbldap/, p. 1-2. Dec. 15, 2004.

"Sadma", http://sadmas.sourceforge.netlen/indexlhtml. p. 1-2. Dec. 15, 2004.

"Sun Enterprise Authentication Mechanism Data Sheet", http://wwws.sun.com/jsp_utils/Printpage.jsp?url, pp. 1-4. Dec. 15, 2004.

Vintela Extends the Reach of Microsoft Group Policy to Unix and Linux; Vintela Group Policy (VGP) Provides a Framework for Unix and Linux Policy-Based Management Through the Popular Windows Group Policy System., PR Newswire, Sep. 13, 2004.

A. Leonard, "Embrace, extend, censor", Originally published May 11, 2000 on salon.com, http://archive.salon.com/tech/log/2000/05/11/slashdot_censor/.

Accelerated Examination Support Document in U.S. Appl. No. 13/198,592, filed Aug. 4, 2011.

Accelerated Examination Support Document in U.S. Appl. No. 13/198,629, filed Aug. 4, 2011.

Aelita Software Domain Migration Wizard 6.0 User's Guide, Aug. 21, 2003.

Affidavit filed with Amendment and Response to Office Action filed Jan. 14, 2008 in U.S. Appl. No. 10/888,845.

Aix 5L Differences Guide Version 5.2 Edition Published Dec. 24, 2002, Excerpt http://proquest.safaribooksonline.com/0738427047/ch091ev1sec13.

Akhgar et al., Secure ICT Services for Mobile and Wireless Communications: A Federated Global Identity Management Framework, 2006 IEEE.

(56) References Cited

OTHER PUBLICATIONS

Alan H. Harbitter et al., "Performance of Public-Key-Enabled Kerberos Authentication in Large Networks", Proceedings of the IEEE symposium on Security and Privacy. 2001.
Amendment and Response to Office Action filed on Jan. 14, 2008 with claims as amended in U.S. Appl. No. 10/888,845.
Antti Tikkanen, "Active Directory and nss_idap for Linux: Centralized er Management," printed from http://www.hut.fi/cc/docskerberos/nss_ldap/htm, pp. 1-11, 2004.
Apurva Kumar, "The OpenLDAP Proxy Cache," IBM, India Research Lab, at least as early as May 2003.
Authentication, from Pieces of the Puzzle, Chapter 2, p. 12. (Exhibit IV to U.S. Appl. No. 95/001,872, Inter Partes Reexamination Renewed Petition (Third Party Requester to Response to Mar. 1, 2012 Office Action), dated Aug. 9, 2012.
Buell, D.A. et al., "Identity management", Internet Computing, IEEEvol. 7, Issue 6, Nov.-Dec. 2003 pp. 26-28.
Centrify DirectControl Administrator's Guide Version 2.0, Aug. 15, 2005.
Chapter 9 Authentication Protocols, Distributed System & Network Security Lab, Department of Computer Science & Information Engineering, National Chiao Tung University, pp. 21-22. 1991.
Claim Chart, Claim 1 vs. Hemsath et al., Garman and Withers (Exhibit II to U.S. Appl. No. 95/001,872, Inter Partes Reexamination Renewed Petition (Third Party Requester to Response to Mar. 1, 2012 Office Action), dated Aug. 9, 2012.
COSuser—Identity management and user provisioning for Unix, Linux and Microsoft Windows® http://www.cosuser.com/ May 24, 2010.
Damiani, E., et al, "Managing multiple and dependable identities" Internet Computing, IEEEvol. 7, Issue 6, Nov.-Dec. 2003 pp. 29-37.
David "Del" Elson, "Active Directory and Linux," printed from http://www.securityfoc.com/printable/infoc /1563, pp. 1-11, 2002.
David F. Carr, "What's Federated Identity Management?", eWeek, Nov. 10, 2003, http://www.eweek.com/printarticle/O,1761.a-111811,00.asp.
Declaration of Nicholas Webb, dated Apr. 13, 2012.
Dennis, Disconnect Login (Was: FC3 Bug Week—Help Wanted) (Sep. 24, 2004).
Description of Digital Certificates, Jan. 23, 2007, available at http://www.support.microsoft.com/kb/195724.
Designing Network Security Published May 7, 1999. Excerpt http://proquest.safaribooksonline.com/1578700434/ch021ev1sec1.
Documentation for Kerberos V5 release krb5-1.3, Copyright 1985-2002, Installation Guide: http://web.mit.edu/Kerberos/krb5-1.6/krb5-1.6/doc/krb5-install.html.
Documentation for Kerberos V5 release krb5-1.3, Copyright 1985-2002, Installation Guide: http://web.mit.edu/Kerberoslkrb5-1.3/krb5-1.3/doc/krb5-install.html—System Administrator's Guide: http://web.mit.edu/Kerberos/krb5-1.3/krb5-1.3/doc/krb5-admin.html—Unix User's Guide: http://web.mit.edu/Kerberos/krb5-1.3/krb5-1.3/doc/krb5- er.html.
Documentation for Kerberos V5 release krb5-1.3, Copyright 1985-2002, System Administrator's Guide: http://web.mit.edu/Kerberos/krb5-1.6/krb5-1.6/doc/krb5-admin.html.
Documentation for Kerberos V5 release krb5-1.3, Copyright 1985-2002, Unix User's Guide: http://web.mit.edu/kerberos/www/krb5-1.2/krb5-1.2.6/doc/user-guide.html.
European Office Action, Application No. 05728119.8-1243 dated Apr. 9, 2009.
European Patent Office Communication pursuant to Article 94(3) EPC dated Apr. 9, 2009.
Fabini et al., "IMS in a Bottle: Initial Experiences from an OpenSER-based Prototype Implementation of the 3GPP IP Multimedia Subsystem" Mobile Business, 2006. ICMB '06. International Conference on Publication Date: 2006; on pp. 13-13.
Garman, "Kerberos—The Definitive Guide," Aug. 2003, O'Reilly & Associates, Inc.
Get to One Options for moving from multiple, Unix identities to a single, AD-based authentication infrastructure with Vintela Authentication Serviceshttp://www.quest.com/Vintela_Authentication_Services/migration_options_VAS.aspx May 24, 2010.
Hank Simon, "Saml:The Secret to Centralized Identity Management", Dec. 2004, http://intelligententerprise.com/showArticle.jhtml?articleID=54200324.
IBM SecureWay Policy Director, 1999. (4 pages).
IBM z/Os V1R1.0-V1R12.0 DCE Application Development Reference: dce_ace_is_cient_authorized API call: URL: http://publib.boulder.ibm.com/infocenter/zos/v1r12/topic/com.ibm.zos.r12.euvmd00/euva6a00646.htm, Copyright IBM Corporation 1990,2010, (2 pages).
Identity Management for Unix http://technet2.microsoft.com/WindowsServer/en/library/ab66b7d2-9cfb-4d76-b707-30a5e0dd84f31033.mspx?mfr=true Aug. 22, 2005.
Implementing Registry-Based Group Policy for Applications, Microsoft Windows 2000 Server. White Paper. 2000.
International Preliminary Report on Patentability and Written Opinion for International Application No. PCT/US2006/039302, mailed on Apr. 2, 2009, in 7 pages.
International Search Report and Written Opinion from International Patent Appl. No. PCT/US2009/038394, mailed Oct. 6, 2009, in 13 pages.
International Search Report in International Application No. PCT/US2006/039302, mailed on Jul. 3, 2008.
International Search Report PCT/US2005/008342 , mailed on Nov. 9, 2006.
Introduction to Group Policy in Windows Server 2003, Microsoft Corporation, Published Apr. 2003.
J. Barr, "The Gates of Hades: Microsoft attempts to co-opt Kerberos", Published Apr. 2000 as verified by the Internet Archive, http://web.archive.org/web/20000619011652/http://www.linuxworld.com/linuxworld/lw-2000-04/lw-04-vcontrol_3.html.
J. Brezak, "HTTP Authentication: SPNEGO Access Authentication as Implemented in Microsoft Windows 2000," http://Meta.cesnet.cz/cms/opencms/en/docs/software/devel/draft-brezek-spnego-http-04.xt, pp. 1-6. 2002.
J. Kohl et al. "RFC 1510: The Kerberos Network Authentication Service (V5)", Published Sep. 1993, http://ietfreport.isoc.org/rfc/PDF/rfc1510.pdf.
Jan De Clercq, "Win.NET Server Kerberos", http://www.winnetmag.com/WindowsSecurity/ Articlesl ArticleID/26450/pg/3/3.html. Sep. 17, 2002.
John Brezak, "Interoperability with Microsoft Windows 2000 Active Directory and Kerberos Services," printed from http://msdn.microsft.com/library/en- /dnactdir/html/kerberossamp.asp?frame=true, pp. 1-4, 2000.
Kerberos, PACs, and Microsoft's Dirty Tricks Originally posted to slashdot.org on May 2, 2000, http://slashdot.org/comments.pl?sid=5268&threshold=1&commentsort=O&mode=thread&cid=1096250.
*KSR Int'l Co.* v. *Teleflex Inc.*, 27 S.Ct. 1727, 1739 (2007).
Langella, S. et al., "Dorian: Grid Service Infrastructure for Identity Management and Federation", Computer-Based Medical Systems, 2006. CBMS 2006. 19th IEEE International Symposium on Jun. 22-23, 2006 pp. 756-761.
Li, M., et al., "Identity management in vertical handovers for UMTS-WLAN networks", Mobile Business, 2005. ICMB 2005. International Conference on Jul. 11-13, 2005 pp. 479-484.
LinuX® and Windows® Interoperability Guide, Published Dec. 14, 2001, Excerpt http://proquest.safaribooksonline.com/0130324779/ch 18/lev1sec3.
Lowe-Norris, Alistair G., Windows 2000 Active Directory, Chapters 8 and 9, pp. 177-245, Jan. 2000.
Matsunaga et al, "Secure Authentication System for Public WLAN Roaming, Proceedings of the 1st ACM international workshop on Wireless mobile applications and services on WLAN hotspots," San Diego, CA, A, Year of Publication: 2003, p. 113-121.
Matthew Hur, "Session Code: ARC241 architecture & infrastructure", Microsoft Corporation. Oct. 26, 2003.
MCSE in a Nutshell: The Windows 2000 Exams Published Feb. 2001. Excerpt http://proquest.safaribooksonline.com/0596000308/mcseian-CHP-13-SECT-1.

(56) References Cited

OTHER PUBLICATIONS

Microsoft Corp., Implementing Registry-Based Group Policy for Applications, 2000.
Microsoft Corp., Introduction to Group Policy in Windows Server 2003, 2003.
Microsoft: CATIA Migration from Unix to Windows, Overview, Jul. 18, 2003. (3 pages).
Microsoft: CATIA Migration from Unix to Windows, Overview, Jul. 18, 2003, Microsoft, Chapter 8, Windows-Unix Interoperability and Data Sharing. (21 pages).
Mikkonen, H. et al., "Federated Identity Management for Grids" Networking and Services, 2006. ICNS '06. International conference on Jul. 16, 18, 2006 pp. 69-69.
Mont, M.C. et al., "Towards accountable management of identity and privacy: sticky policies and enforceable tracing services", Database and Expert Systems Applications, 2003. Proceedings. 14th International Workshop on Sep. 1-5, 2003 pp. 377-382.
NCSA Introduction to Kerberos 5, All right reserved Board of Trustees of the University of Illinois Page last updated May 21, 2002 http://www.ncsa.uiuc.edu/UserInfo/Resources/Sofiware/kerberosold/introduction.html.
Neuman et al., "RFC 4120—The Kerberos Network Authentication Service V5," Network Working Group, Jul. 2005.
Neuman, et al.: "Kerberos: An Authentication Service for Computer Networks", IEEE Communications Magazine, vol. 32, Issue 9, Pub. Date Sep. 1994, relevant pp. 33-38.
O'Reily publications "Unix & Internet Security", Apr. 1996. (3 pages).
PADL Software Pty Ltd., http://www.padl.com/productslXAD.html, pp. 1-3. Dec. 15, 2004.
Padl Software Pty Ltd., Pam_ccreds readme, (Apr. 11, 2004) (pan_crreds).
Phiri, J. et al., "Modelling and Information Fusion in Digital Identity Management Systems" Networking, International Conference on Systems and International Conference on Mobile Communications and Learning Technologies, 2006. ICN/ICONS/MCL 2006. International Conference on Apr. 23-29, 2006 pp. 181-181.
Quest Software; "Unix Identity Migration Wizard User Guide", 2006.
Quest Vintela Authentication Services Administrator's Guide Version 3.1, Sep. 2006.
Radeke, E., et al. "Framework for object migration in federated database systems", Cooperation Univ. of Paderborn, Germany, Parallel and Distributed Information Systems, 1994., Proceedings of the Third International Conference on Publication Date: Sep. 28-30, 1994, On pp. 187-194.
RFC 4120—"The Kerberos Network Authentication Service V5," Neuman et al., Network Working Group, Jul. 2005.
Sandrasegaran, Hsang, Identity Management in Vertical Handovers for UMTS-WLAN Networks, 2005 IEEE.
Schroeder, SDSC's Installation and Development of Kerberos, San Diego Supercomputer Center, San Diego, CA, Sep. 20, 1995, p. 1-11.
Search Security, "Search Security.com Definitions", Jun. 4, 2007, http://searchsecurity.techtarget.com/sDefinition/0,,sid14_gci212437,00.html.
Shim, S.S.Y et al., "Federated identity management" Computer; vol. 38, Issue 12, Dec. 2005 pp. 120-122.
Shin, D. et al., "Ensuring information assurance in federated identity management", Performance, Computing, and Communications, 2004 IEEE International Conference on 2004 pp. 821-826.
Siddiqi, J. et al., "Secure ICT Services for Mobile and Wireless Communications: A Federated Global Identity Management Framework", Information Technology: New Generations, 2006. ITNG 2006. Third International Conference on Apr. 10-12, 2006 pp. 351-357.
Sixto Ortiz, Jr., "One-Time Password Technology", vol. 29, Issue 15, Apr. 13, 2007, http://www.processor.com/editorial/article.asp?article=articles%2Fp2915%2F30p15%2F30p15.asp.
Subject 2.15. What do I need to do to setup cross-realm authentication?, http://www.cmf.nrl.navy.mil/CCS/people/kenh/kerberos-fag.html. Jul. 8, 2010.
The SLAPD and SLURPD Administrator's Guide, University of Michigan Release 3.3 Apr. 30, 1996, available at http://www.umich.edu/~dirsvcs/Idap/doc/guides/slapd/guide.pdf.
Turbo Fredriksson, "LDAPv3." printed from http://www.bayour.com/LDAPv3-HOWTO.html, pp. 2-65, 2001.
U.S. Appl. No. 11/311,215, Amendment and Response to Office Action filed Jun. 14, 2010.
U.S. Appl. No. 11/311,215, Claims in "red-line" form as amended by the applicant.
U.S. Appl. No. 11/311,215, Claims in "red-line" form as amended by the Examiner.
U.S. Appl. No. 95/001,872 Reexamination Action Closing Prosecution mailed Jan. 23, 2013.
U.S. Application No. 95/001,872 Reexamination Office Action mailed Aug. 6, 2012.
U.S. Application No. 95/001,872 Reexamination Office Action mailed Mar. 1, 2012.
U.S. Appl. No. 95/001,872 Reexamination Office Action Response filed Apr. 30, 2012.
U.S. Application No. 95/001,872 Reexamination Order Granting Inter Partes Reexamination mailed Mar. 1, 2012.
U.S. Appl. No. 95/001,872 Reexamination Petition Decision mailed Jul. 18, 2012.
U.S. Appl. No. 95/001,872 Reexamination Request for Inter Partes Reexamination filed Jan. 12, 2012.
U.S. Appl. No. 95/001,872 Reexamination Response to Office Action filed Oct. 5, 2012, including Exhibits K, L, L-1, L-2, L-3, and L-4.
U.S. Appl. No. 95/001,872 Reexamination Right of Appeal Notice mailed Apr. 23, 2013.
U.S. Appl. No. 95/001,872, Inter Partes Reexamination , Third Party Requester's Comments on the Patent Owner Response to Aug. 6, 2012 Office Action, dated Nov. 1, 2012.
U.S. Appl. No. 95/001,872, Inter Partes Reexamination Renewed Petition (Third Party Requester to Response to Mar. 1, 2012 Office Action), dated Aug. 9, 2012.
U.S. Appl. No. 95/001,872, Inter Partes Reexamination, Decision Denying Petition (Third Party's Petition filed Aug. 9, 2012), dated Nov. 1, 2012.
Ventuneac et al., A policy-based security framework for Web-enabled applications, Proceeding ISICT '03, Proceedings of the 1st International Symposium on Information and Communication Technologies, pp. 487-492.
Vintela Group Policy Technology Preview, "Extending the Power of Group Policy and Windonws Active Directory to configuration of Unix and Linux users and systems", Version 0.1, May 2004.
Wedgetail Communications; "Security Assertion Markup Language (SAML)", 2004.
Weitzner, D.J., "In Search of Manageable Identity Systems", IEEE Internet Computing, vol. 10, Issue 6, Nov.-Dec. 2006 pp. 84-86.
Windows 2000 Kerberos Authentication White Paper, Microsoft Windows 2000 Server, pp. 1-5 and 41-42. Jul. 12, 2010.
Withers, Integrating Windows 2000 and Unix Using Kerberos, the Journal for Unix Systems Administrators, vol. 10, No. 12, Dec. 2001. http://seann.herdejurgen.com/resume/samag.com/html/v10/il2/a5.htm.
Dec. 6, 2013 Listing of Related Applications.
*Windows 2000 Active Directory* by Alistair G. Lowe-Norris, Chapters 8 and 9, pp. 177-245, published Jan. 2000 (WAD).
U.S. Appl. No. 95/001,458, Inter Partes Reexamination Request of co-owned U.S. Patent No. 7,617,501.

* cited by examiner

APPARATUS, SYSTEMS AND METHODS TO PROVIDE AUTHENTICATION SERVICES TO A LEGACY APPLICATION

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to computer network authentication services. Specifically, the invention relates to apparatus, methods, and systems for providing authentication services to legacy applications.

2. Description of the Related Art

In recent years, computer networks have been increasingly significant in terms of the quantity and sensitivity of the data communicated. Once used primarily for academic purposes, the Internet has become a vehicle for communicating such confidential information as credit card transactions, bank account transactions, and corporate intellectual property. The same applies to proprietary corporate networks. As the quantity and value of the data being communicated has increased, the threats to the security of this data have increased proportionately.

One of the technologies developed to address data security threats is Kerberos authentication. Kerberos provides a means for sensitive data to be communicated securely across an insecure network. Kerberos authentication relies on the existence of a Kerberos server that certifies a user's identity to network services utilized by an application the user is running. Services that use Kerberos to authenticate users are said to be "Kerberized."

Many organizations use legacy applications that are not capable of using Kerberized services. These organizations face the dilemma of undergoing an expensive upgrade or rewriting of their legacy applications, or facing the increasing threats to the security of their data.

Given the aforementioned issues and challenges related to providing authentication services and the shortcomings of currently available solutions, a need exists for an apparatus, method, and system for providing authentication services to legacy applications. Beneficially, such an apparatus, method, and system would translate legacy authentication services to Kerberos authentication services.

SUMMARY OF THE INVENTION

The present invention has been developed in response to the present state of the art, and in particular, in response to the problems and needs in the art that have not yet been fully solved by currently available authentication services. Accordingly, the present invention has been developed to provide an apparatus, method, and system for providing authentication services to legacy applications that overcome many or all of the above-discussed shortcomings in the art.

In one aspect of the present invention, an apparatus for providing authentication services to legacy applications includes an authentication translation module that receives authentication credentials corresponding to a legacy authentication protocol with the authentication proxy module further configured to authenticate the user corresponding to the received credentials using the Kerberos authentication protocol. The authentication proxy module may be further configured to authenticate users in circumstances where Kerberos authentication services are temporarily unavailable. In some embodiments, the apparatus for providing authentication services to legacy applications includes a credential binding module configured to associate legacy authentication credentials with corresponding Kerberos credentials.

In another aspect of the present invention, a method for providing authentication services to legacy applications includes directing authentication legacy authentication protocol credentials to a local authentication process that authenticates the user corresponding to the credentials, using the Kerberos authentication protocol. In one embodiment, the method further includes associating a plurality of users with corresponding legacy authentication credentials and Kerberos credentials. In another embodiment, the method further includes translating anonymous authentication requests to authentication requests for network directory services computer objects or service objects. This embodiment provides additional network security benefits by facilitating configuring network directory servers to prevent anonymous users from searching the network directory.

Various elements of the present invention may be combined into a system arranged to carry out the functions or steps presented above. In one embodiment, the system includes a client configured to authenticate using a legacy authentication protocol, an application configured to receive credentials from the client and direct them to an authentication proxy module, the authentication proxy module, a Kerberos server, and an application server that provides a Kerberos-secured service. Legacy authentication credentials are transmitted from the client to the authentication proxy module, which authenticates the user to the Kerberos server and passes the Kerberos credentials corresponding to the user to the Kerberos-secured service.

In some embodiments, the system may further include a credential binding module that associates each user with the corresponding legacy authentication credentials and one or more Kerberos credentials. In various embodiments, the legacy authentication credentials may include a user name, password, biometric, or the like. In various embodiments, the legacy authentication protocol may be RADIUS, TACACS, or the like, or may be a data access protocol that involves authentication such as ftp, LDAP, SQL, ODBC, or the like.

The present invention facilitates providing authentication services to legacy applications. These and other features and advantages of the present invention will become more fully apparent from the following description and appended claims, or may be learned by the practice of the invention as set forth hereinafter.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 2:
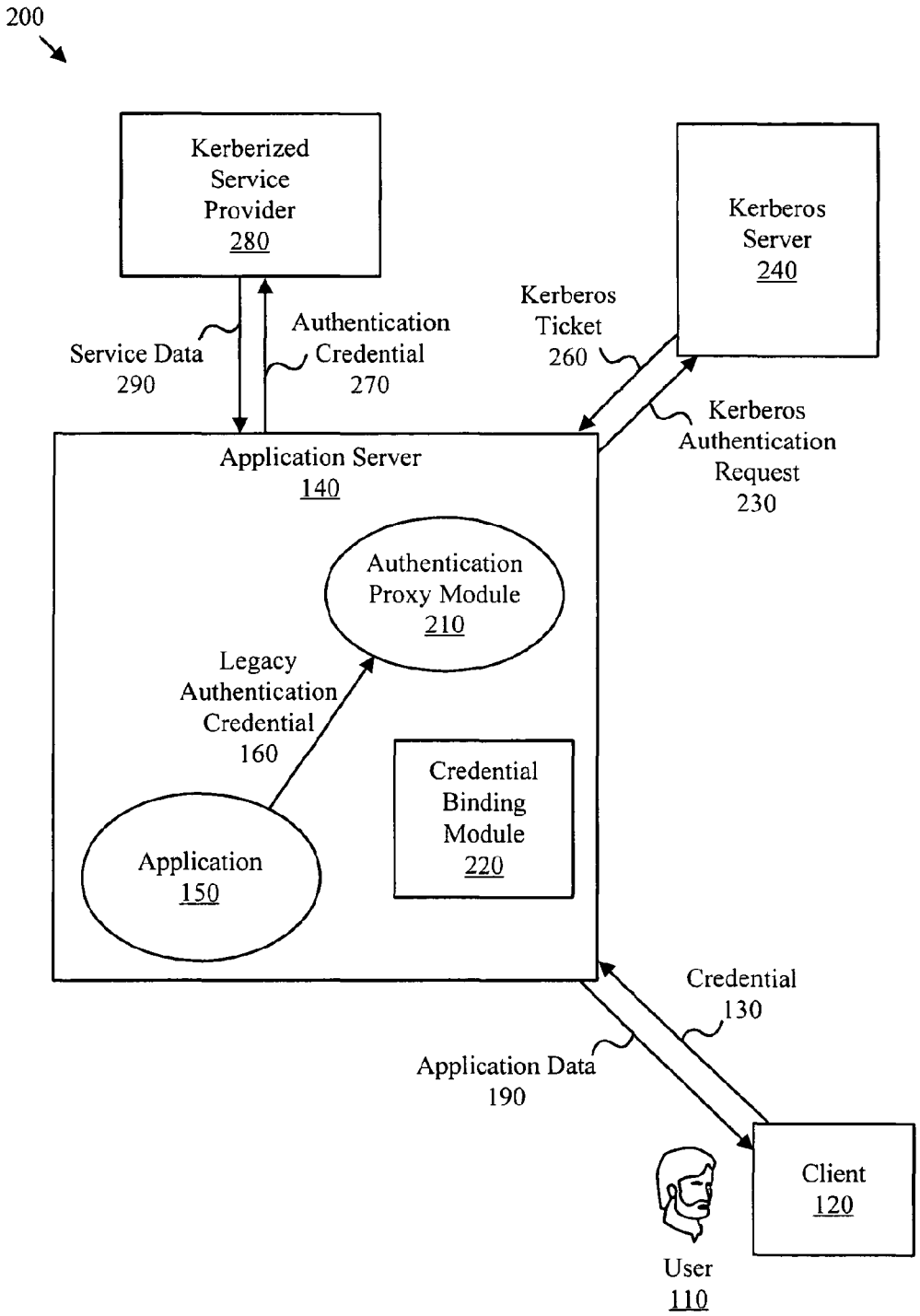
FIG. 2 is a block diagram illustrating an authentication protocol translation system in accordance with the present invention.
Figure 3:
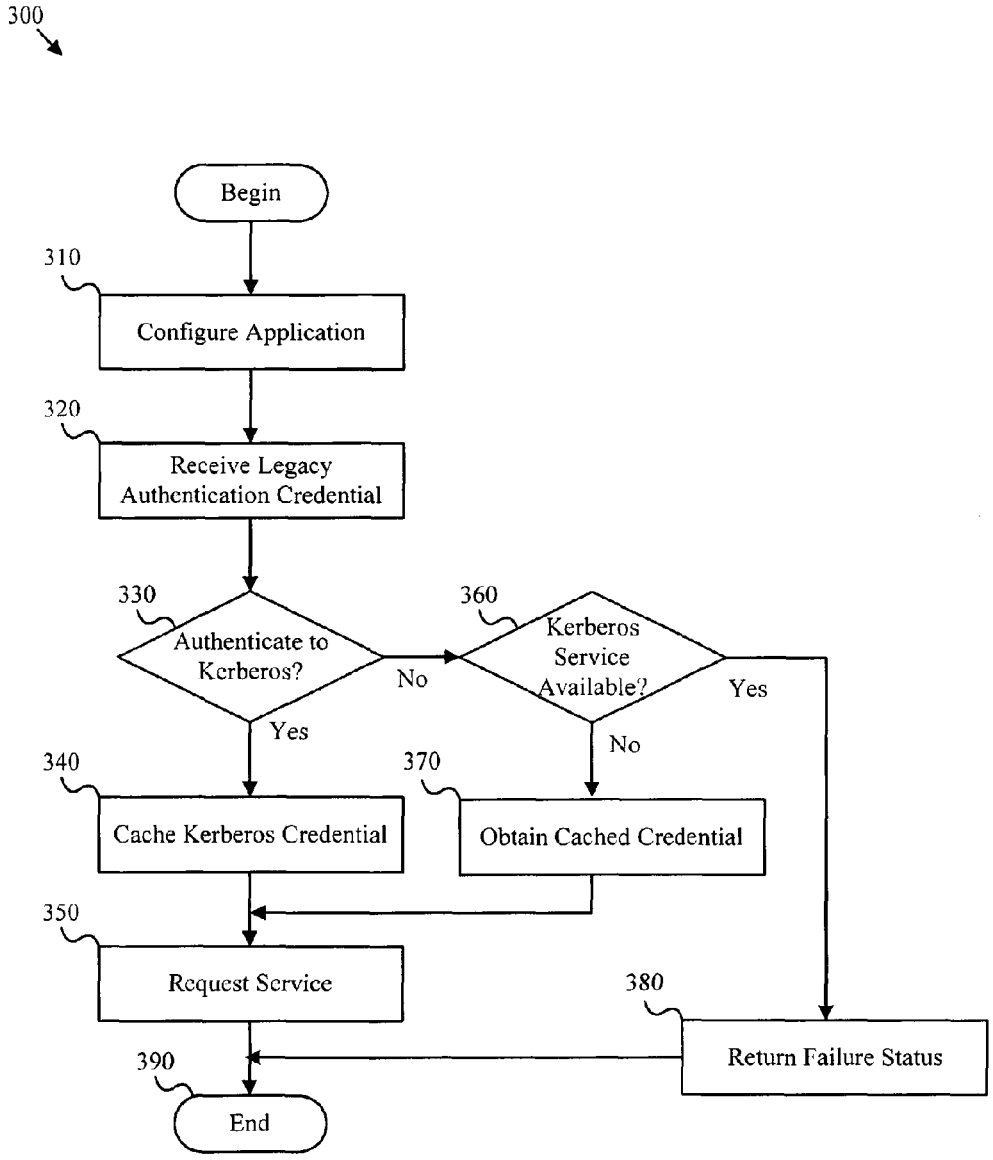
FIG. 3 is a flow chart diagram illustrating one embodiment of an authentication protocol translation method of the present invention.

It will be readily understood that the components of the present invention, as generally described and illustrated in the Figures herein, may be arranged and designed in a wide variety of different configurations. Thus, the following more detailed description of the embodiments of the apparatus, method, and system of the present invention, as represented in FIGS. 2 and 3, is not intended to limit the scope of the invention, as claimed, but is merely representative of selected embodiments of the invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices, such as a computer readable storage medium. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

The features, structures, or characteristics of the invention described throughout this specification may be combined in any suitable manner in one or more embodiments. For example, reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," or similar language throughout this specification do not necessarily all refer to the same embodiment and the described features, structures, or characteristics may be combined in any suitable manner in one or more embodiments.

The present invention sets forth an apparatus, system and method for providing authentication services to legacy applications. Authentication requests from legacy applications are directed to an authentication proxy module that translates authentication requests to authenticate to Kerberized services. From the user's standpoint, there is no change in the authentication process, nor is any modification required to the legacy application.

Figure 1:
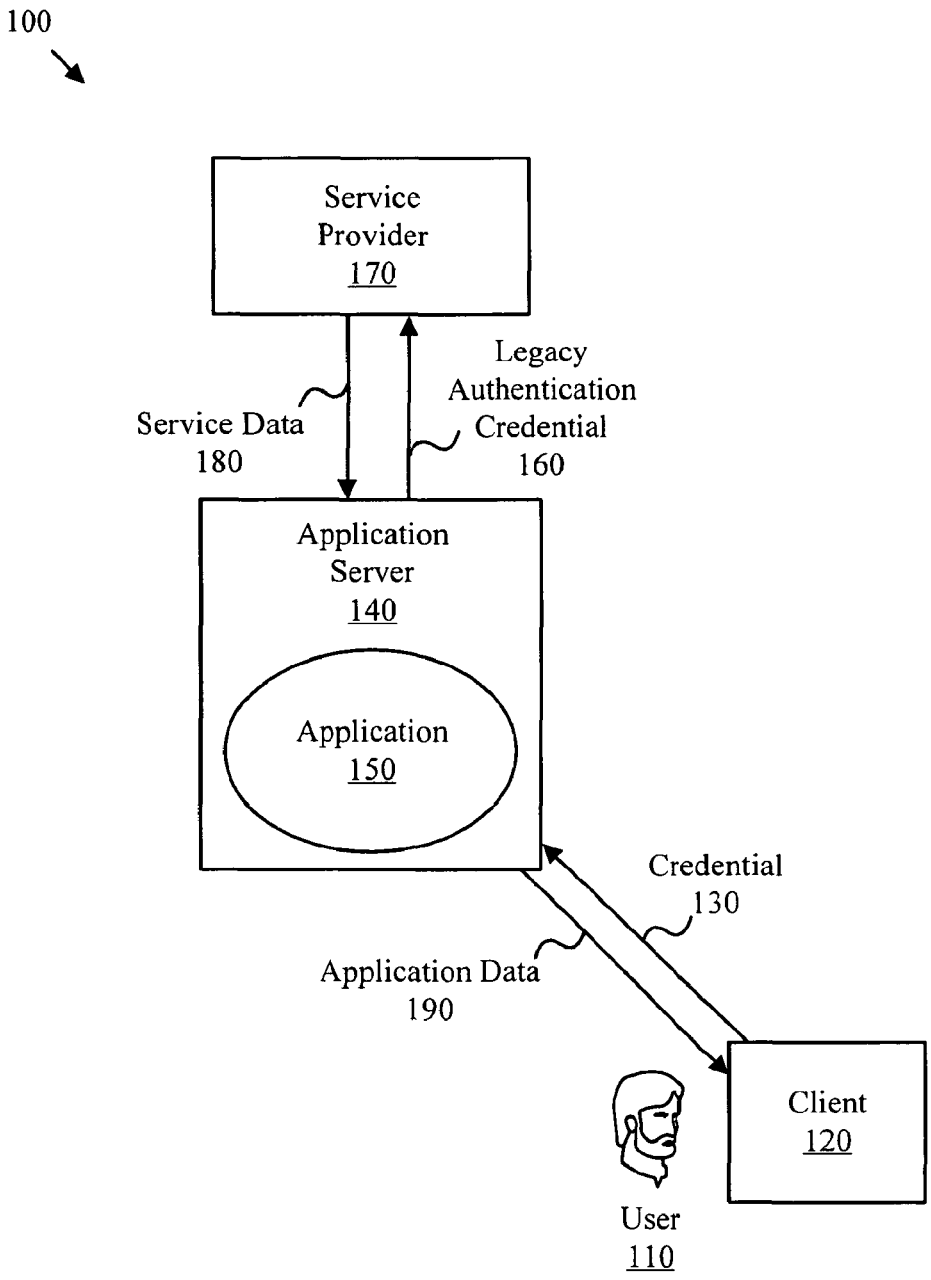
(Prior Art) Fig. 1
FIG. 1 is a block diagram illustrating a typical prior art authentication system.

FIG. 1 is a block diagram illustrating a typical prior art authentication system 100. The prior art authentication system 100 includes a user 110, a client 120, a credential 130, an application server 140, an application 150, an authentication credential 160, a service provider 170, service data 180, and application data 190. The authentication credential 160 typically uses an authentication protocol less secure than Kerberos, such as LDAP, TACACS, or RADIUS, and may even involve passing a user name and password to the service provider 170 in clear text via an unsecured network.

The user 110 enters a credential 130 at the client 120 at the request of the application 150 running on the application server 140. The credential 130 typically consists of a user name and password. The application 150 utilizes services provided by the service provider 170 and authenticates to it by passing the authentication credential 160. The service provider returns service data 180 to the application 150. The cycle completes when the application 150 returns application data 190 to the client 120. In other embodiments, application data 190 may be stored in a database or directed to another process or service.

Because the authentication credential 160 may be transmitted across an unsecured network, it is subject to eavesdropping attacks in which an unauthorized user copies the authentication credential 160 as it is transmitted, or spoofing attacks in which an unauthorized user intercepts the authentication credential 160 by emulating the service provider 170. Replacing the service provider 170 with a Kerberized service may prevent such attacks, but the legacy application 150 is not configured to authenticate using Kerberos. Because the Kerberos authentication algorithm is more complex than older authentication protocols, it is typically not possible to reconfigure a legacy application 150 to use Kerberos authentication, and rewriting a legacy application 150 to authenticate using Kerberos typically involves a considerable investment of cost and time. A further advantage to replacing service provider 170 with a Kerberized service is that duplicate user accounts on servers in an organization's network may be consolidated, thereby reducing the administrative overhead required.

FIG. 2 is a block diagram illustrating an authentication protocol translation system 200 in accordance with the present invention. The authentication protocol translation system 200 may include components of the prior art authentication system 100 and may additionally include an authentication proxy module 210, a credential binding module 220, a Kerberos authentication request 230, a Kerberos server 240, a Kerberos ticket 260, an authentication credential 270, a Kerberized service provider 280, and service data 290. The authentication protocol translation system 200 facilitates translation of the credential 130 to an authentication request 230 that allows authentication to the Kerberized service provider 280. In some embodiments, the Kerberos ticket 260 may be a Kerberos identity.

In one embodiment, legacy authentication credentials 160 are configured to be submitted from the application 150 to the authentication proxy module 210. The authentication proxy module 210 receives the authentication credential 160 from the application 150 and invokes a corresponding Kerberos authentication request 230 for the Kerberos server 240. The Kerberos server 240 returns a Kerberos ticket 260 to the authentication proxy module 210, which then submits an authentication credential 270 to the Kerberized service provider 280. Once authentication to the Kerberized service provider 280 has completed successfully, service data 290 may be returned to the legacy application 150. In the embodiment depicted in FIG. 2, the authentication proxy module 210 runs on the application server 140. In other embodiments, the authentication proxy module 210 resides on a separate server.

The Kerberos protocol is actually more complex than represented in FIG. 2. For example, in response to the Kerberos authentication request 230, the Kerberos server 240 issues a service key to both the Kerberized service provider 280 and the issuer of the Kerberos authentication request, the authentication proxy module 210 in this embodiment. For purposes of simplicity, some details of the Kerberos authentication protocol are not depicted in FIG. 2, but are represented by the Kerberos ticket 260 and the authentication credential 270 that the authentication proxy module 210 submits to the Kerberized service provider 280.

In some embodiments, a credential binding module 220 includes an association between the legacy authentication protocol credentials for each user 110 and the corresponding Kerberos authentication credentials. In other embodiments, the association between the legacy and corresponding Kerberos credentials for each user 110 may be intrinsic to the authentication proxy module 210. In some embodiments, the credential binding module associates credentials corresponding to a legacy authentication protocol with a Kerberos identity, rather than a cached Kerberos ticket 260.

FIG. 3 is a flow chart diagram illustrating one embodiment of an authentication protocol translation method 300 of the present invention. The authentication protocol translation method 300 includes a configure application operation 310, a receive legacy authentication credential operation 320, an authenticate to Kerberos test 330, a cache Kerberos credential operation 340, a request service operation 350, a Kerberos service available test 360, an obtain cached credential operation 370, and a return failure status operation 380. The authentication protocol translation method 300 facilitates translation of an authentication credential 160 issued by a legacy application 150 into a Kerberos authentication request 230 resulting in authentication to a Kerberized service provider 280.

The configure application operation 310 initializes the authentication proxy module 210 by directing the authentication credential 160 from the service provider 170 to the authentication proxy module 210. The authentication proxy module 210 thereafter is configured to receive a legacy authentication credential from the application 150 and intermediate between the legacy application 150 and the Kerberized service provider 280. In some embodiments, the legacy application 150 is configured to submit the authentication credential 160 to the authentication proxy module 210, rather than the service provider 170. In some embodiments, the configure application operation 310 is a setup program for the authentication protocol translation apparatus comprising the authentication proxy module 210 and the credential binding module 220.

The receive legacy authentication credential operation 320 receives an authentication credential 160 directed to the authentication proxy module 210. The authentication credential 160 may include a user name and password passed in clear text. In some embodiments, the receive legacy authentication credential operation 320 enters the authentication credential 160 into a table or database for later association with the corresponding Kerberos ticket 260. In some embodiments, the authentication credential 160 is stored in encrypted form. In some embodiments, the authentication credential 160 may be associated with a Kerberos identity.

In some embodiments, the authentication credential 160 may be stored in a database in clear text or encrypted form or be newly-assigned for the user 110. The receive legacy authentication credential operation 320 may receive the legacy authentication credential 160 from a database or user account initialization process to obtain a corresponding Kerberos ticket 260. Although the Kerberos ticket 260 may be expired when the user 110 subsequently authenticates, successfully decrypting the Kerberos ticket 260 using the authentication credential 160 submitted by the user 110 demonstrates that the authentication credential provided is correct. Generating the Kerberos ticket 260 prior to user 110 authentication facilitates subsequent authentication of the user 110 when the Kerberos server 240 is not available, even though the user 110 may never have previously authenticated to the network.

The authenticate to Kerberos test 330 determines whether the user 110 can be authenticated to the Kerberos server 240 after submitting a Kerberos authentication request 230. If the Kerberos server 240 returns a Kerberos ticket 260 to the authentication proxy module 210, the authentication protocol translation method 300 continues with the cache Kerberos credential operation 340. Otherwise, the authentication protocol translation method 300 continues with the return failure status operation 380.

The cache Kerberos credential operation 340 associates the Kerberos ticket 260 with the authentication credential 160 corresponding to the user 110. In some embodiments, the cache Kerberos credential operation 340 enters the Kerberos ticket 260 into the table or database utilized by the legacy authentication credential operation 320. In various embodiments, the table or database may be intrinsic to the authentication proxy module 210 or may be included in the credential binding module 220.

The request service operation 350 submits an authentication credential 270 in accordance with the Kerberos authentication protocol to the Kerberized service provider 280 and receives any service data 290 returned by the Kerberized service provider 280. The service data 290 is then redirected to the legacy application 150. The service data 290 returned by the Kerberized service provider 280 is returned in encrypted form, using a temporary service key provided by the Kerberos server 240. Transmitting the service data in encrypted form increases the security of the service provided by the Kerberized service provider 280. In some embodiments, the authentication proxy module 210 receives service data 290 and returns the service data 290 to the application 150 as a proxy for the non-Kerberized service provider 170. Upon completion of the request service operation, the authentication protocol translation method 300 ends 390.

The Kerberos service available test 360 determines whether Kerberos authentication failed because the Kerberos server did not respond, due to a network error, hardware failure, or the like. If authentication failed because the Kerberos service was not available, the authentication protocol translation method 300 continues with the obtain cached credential procedure 370. Otherwise, the authentication protocol translation method 300 continues with the return failure status operation 380.

The obtain cached credential operation 370 obtains the cached Kerberos ticket 260 with the authentication credential 160 corresponding to the user 110. The authentication credential 160 may be considered valid if the cached Kerberos ticket 260 can be successfully decrypted using the authentication credential 160. Using the cached Kerberos ticket 260 facilitates uninterrupted access to services provided by the Kerberized service provider 280 when the Kerberos server 240 is unavailable due to network failure or the like. In some embodiments, the authentication protocol translation method 300 provides the cached Kerberos ticket 260 as long as the ticket remains valid, thus reducing the number of authentication requests submitted to the Kerberos server 240.

The return failure status operation 380 reports a failure to authenticate to the Kerberos server 240 to the legacy application 150. In some embodiments, the return failure status operation 380 may delete the authentication credential 160 from the table or database in which it was stored by the receive legacy authentication credential operation 320. Upon completion of the return failure status operation 360, the authentication protocol translation method 300 ends 390.

Figure 4:
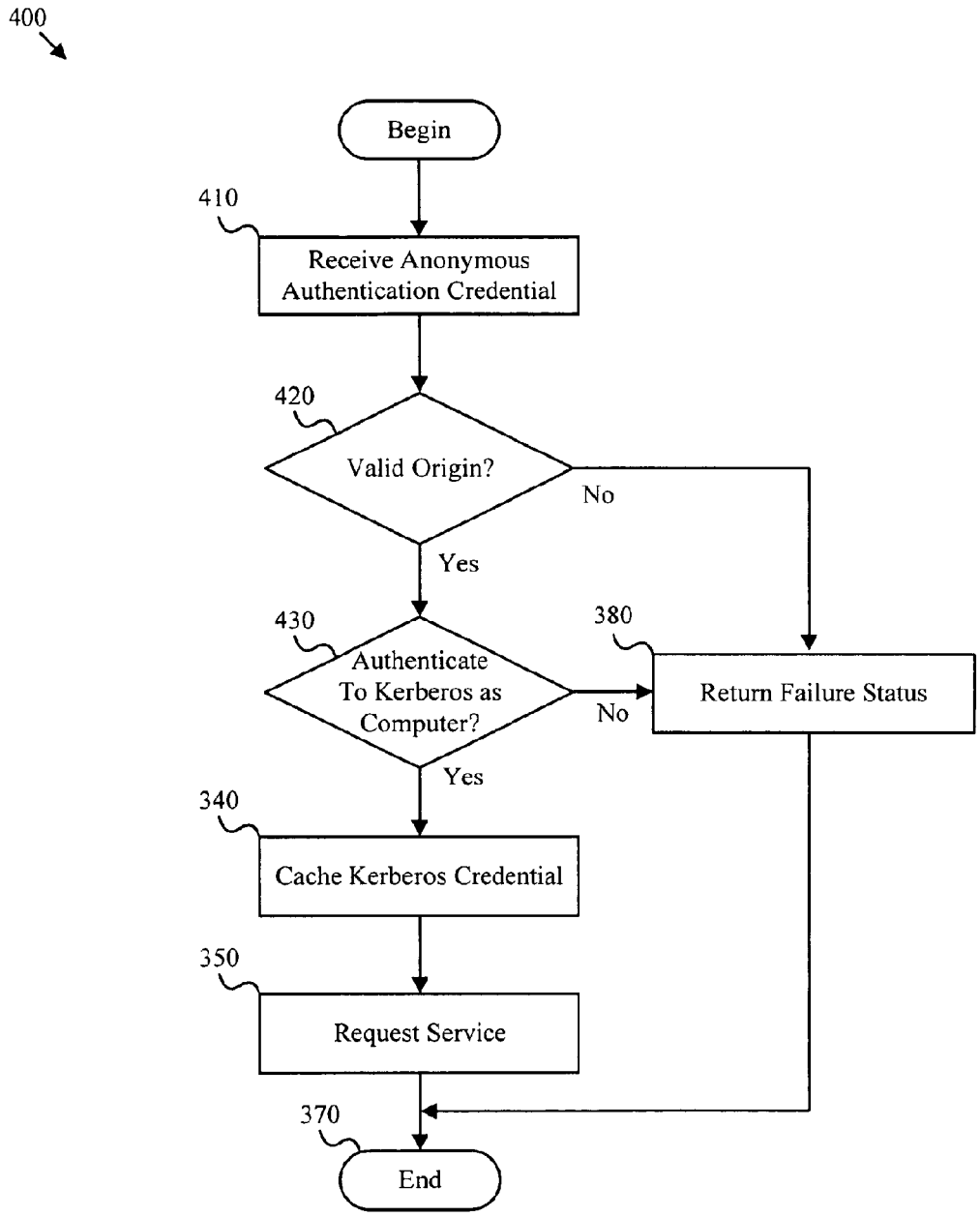
FIG. 4 is a flow chart diagram illustrating an anonymous user authentication protocol translation method of the present invention.

FIG. 4 is a flow chart diagram illustrating an anonymous user authentication protocol translation method 400 of the present invention. The anonymous user authentication protocol translation method 400 includes procedures of the authentication protocol translation method 300. In addition, the anonymous user authentication protocol translation method 400 includes a receive anonymous authentication credential operation 410, a valid origin test 420, and an authenticate to Kerberos as computer test 430.

The anonymous user authentication protocol translation method 400 translates anonymous bind requests into Kerberos authentication requests for the computer object or service object associated with the client 120 from which the anonymous bind request originates. The Kerberos server 240 can be configured to not accept anonymous bind requests, thus protecting the Kerberos server 240 from attack from foreign network addresses. Once the client 120 has authenticated as a computer object or service object, the client 120 may then be permitted to search the network directory. For example, the user 110 may enter a common name and password, which the authentication proxy module 210 may use to search the directory to obtain the distinguished name associated with the common name, so that the user 110 may be authenticated using the associated distinguished name and password.

Since there are no network directory objects associated with anonymous binds, there is no mechanism for the network administrator to manage computers that connect using anonymous binds. Converting anonymous binds to computer object authentications facilitates management of the associated computers using network directory services prior to authentication. For example, a computer object can be assigned to an organizational unit, so that a login script associated with the organizational unit is executed when the computer object authenticates. Additionally, converting anonymous binds to computer object authentications increases network security by allowing only a trusted client 120 to access network directory services. For example, when unauthorized users are permitted to bind to the network directory service anonymously, they may obtain user names that may be used with a dictionary attack to obtain unauthorized access to the network.

The receive anonymous authentication credential operation 410 receives an anonymous authentication credential corresponding to the authentication credential 160. In some embodiments, an anonymous authentication credential 160 may include a common name and network password of a user to be authenticated using the distinguished name associated with the common name.

The valid origin test 420 verifies that the authentication credential 160 originated from a trusted source. In some embodiments, the application server 140 may be configured such that the authentication credential 160 is received from a secure network. If the authentication credential 160 originated from a trusted source, the anonymous user authentication protocol translation method 400 continues with the authenticate to Kerberos as computer test 430. Otherwise, the anonymous user authentication protocol translation method 400 continues with the return failure status procedure 380.

The authenticate to Kerberos as computer test 430 determines whether the authentication proxy module 210, acting as a proxy for the client 120, can authenticate to Kerberos as a computer object. In some embodiments, the authentication proxy module 210 uses one service account for a plurality of clients 120. Authentication may not be possible if the Kerberos server is unavailable due to a network failure. If the authentication proxy module 210 authenticates to Kerberos, the anonymous user authentication protocol translation method 400 continues with the cache Kerberos credential procedure 340. Otherwise, the anonymous user authentication protocol translation method 400 continues with the return failure status procedure 380.

The present invention facilitates providing authentication services to legacy applications. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

[1. A system to provide authentication services to legacy applications, the system comprising:

one or more legacy applications executing on an application server and configured to authenticate a user based on one or more user credentials received from a client using a legacy authentication protocol, wherein the one or more legacy applications are not configured to authenticate using a Kerberos authentication protocol;

an authentication proxy module executing on a computing device and configured to receive legacy authentication credentials from the one or more legacy applications corresponding to the legacy authentication protocol, wherein the legacy authentication credentials are associated with the one or more user credentials; and a credential binding module in communication with the authentication proxy module and configured to associated the legacy authentication credentials with a cached Kerberos credential, and wherein the authentication proxy module is further configured to: (i) authenticate the user corresponding to the legacy authentication credentials using a Kerberos authentication protocol by invoking a Kerberos authentication request to a Kerberos server, and (ii) use the cached Kerberos credential received from the credential binding module to authenticate the user when the Kerberos server is temporarily unavailable.]

2. [The system of claim 1,] *A system to provide authentication services to legacy applications, the system comprising:*

*one or more legacy applications executing on an application server and configured to authenticate a user based on one or more user credentials received from a client, wherein the one or more legacy applications are not configured to authenticate using a Kerberos authentication protocol;*

*an authentication proxy module executing on a computing device and configured to receive legacy authentication credentials from the one or more legacy applications, wherein the legacy authentication credentials are associated with the one or more user credentials; and*

*a credential binding module in communication with the authentication proxy module and configured to associate the legacy authentication credentials with a cached Kerberos credential,*

*wherein the authentication proxy module is further configured to: (i) authenticate the user corresponding to the legacy authentication credentials using a Kerberos authentication protocol by invoking a Kerberos authentication request to a Kerberos server, and (ii) use the cached Kerberos credential received from the credential binding module to authenticate the user when the Kerberos server is temporarily unavailable;* wherein the cached Kerberos credential comprises a previously-generated Kerberos credential, and wherein the authentication proxy module is further configured to use the previously-generated Kerberos credential to authenticate a user that has not previously been authenticated by the one or more legacy applications, when the Kerberos server is temporarily unavailable.

3. [The system of claim 1,] *A system to provide authentication services to legacy applications, the system comprising:*

*one or more legacy applications executing on an application server and configured to authenticate a user based on one or more user credentials received from a client using a legacy authentication protocol, wherein the one or more legacy applications are not configured to authenticate using a Kerberos authentication protocol;*

*an authentication proxy module executing on a computing device and configured to receive legacy authentication credentials from the one or more legacy applications corresponding to the legacy authentication protocol, wherein the legacy authentication credentials are associated with the one or more user credentials; and*

*a credential binding module in communication with the authentication proxy module and configured to associate the legacy authentication credentials with a cached Kerberos credential,*

*wherein the authentication proxy module is further configured to: (i) authenticate the user corresponding to the legacy authentication credentials using a Kerberos authentication protocol by invoking a Kerberos authentication request to a Kerberos server, and (ii) use the cached Kerberos credential received from the credential binding module to authenticate the user when the Kerberos server is temporarily unavailable;*

*and* wherein the authentication proxy module is further configured to eliminate anonymous binds by authenticating as a network directory services object as a proxy for an anonymous user.

[4. The system of claim 1, wherein the legacy authentication credentials comprise a user name and password.]

5. [The system of claim 1,] *A system to provide authentication services to legacy applications, the system comprising:*

*one or more legacy applications executing on an application server and configured to authenticate a user based on one or more user credentials received from a client using a legacy authentication protocol wherein the one or more legacy applications are not configured to authenticate using a Kerberos authentication protocol;*

*an authentication proxy module executing on a computing device and configured to receive legacy authentication credentials from the one or more legacy applications corresponding to the legacy authentication protocol, wherein the legacy authentication credentials are associated with the one or more user credentials; and*

*a credential binding module in communication with the authentication proxy module and configured to associate the legacy authentication credentials with a cached Kerberos credential,*

*wherein the authentication proxy module is further configured to: (i) authenticate the user corresponding to the legacy authentication credentials using a Kerberos authentication protocol by invoking a Kerberos authentication request to a Kerberos server, and (ii) use the cached Kerberos credential received from the credential binding module to authenticate the user when the Kerberos server is temporarily unavailable;*

*and* wherein the legacy authentication credentials comprise a biometric.

[6. The system of claim 1, wherein the legacy authentication protocol is selected from the group consisting of RADIUS, TACACS, ftp, LDAP, SQL and ODBC.]

[7. The system of claim 1, wherein the application server comprises the computing device.]

[8. The system of claim 1, wherein the cached Kerberos credential comprises a Kerberos ticket.]

[9. The system of claim 1, wherein the authentication proxy module is further configured to determine availability of the Kerberos server.]

[10. An apparatus to provide authentication services to legacy applications, the apparatus comprising:

an authentication proxy module executing on a computing device and configured to receive from one or more legacy applications executing on an application server legacy authentication credentials corresponding to a legacy authentication protocol, wherein the one or more legacy applications are not configured to use a Kerberos authentication protocol to authenticate a user; and a credential binding module in communication with the authentication proxy module and configured to associate the legacy authentication credentials with a Kerberos credential, and wherein the authentication proxy module is further configured to: (i) authenticate a user corresponding to the legacy authentication credentials using a Kerberos authentication protocol by invoking a Kerberos authentication request to a Kerberos server, and (ii) use the Kerberos credential received from the credential binding module to authenticate the user when the Kerberos server is temporarily unavailable.]

11. [The apparatus of claim 10,] *An apparatus to provide authentication services to legacy applications, the apparatus comprising:*

*one or more legacy applications executing on an application server and configured to authenticate a user based on one or more user credentials received from a client using a legacy authentication protocol, wherein the one or more legacy applications are not configured to authenticate using a Kerberos authentication protocol;*

*an authentication proxy module executing on a computing device and configured to receive legacy authentication credentials from the one or more legacy applications corresponding to the legacy authentication protocol, wherein the legacy authentication credentials are associated with the one or more user credentials; and*

*a credential binding module in communication with the authentication proxy module and configured to associate the legacy authentication credentials with a cached Kerberos credential,*

*wherein the authentication proxy module is further configured to: (i) authenticate the user corresponding to the legacy authentication credentials using a Kerberos authentication protocol by invoking a Kerberos authentication request to a Kerberos server, and (ii) use the cached Kerberos credential received from the credential binding module to authenticate the user when the Kerberos server is temporarily unavailable;* wherein the Kerberos credential comprises a previously-generated Kerberos credential, and wherein the authentication proxy module is further configured to use the previously-generated Kerberos credential to authenticate a user that has not previously been authenticated by the one or more legacy applications, when Kerberos authentication services are temporarily unavailable.

12. [The apparatus of claim 10,] *An apparatus to provide authentication services to legacy applications, the apparatus comprising:*

*one or more legacy applications executing on an application server and configured to authenticate a user based on one or more user credentials received from a client using a legacy authentication protocol, wherein the one or more legacy applications are not configured to authenticate using a Kerberos authentication protocol;*

*an authentication proxy module executing on a computing device and configured to receive legacy authentication credentials from the one or more legacy applications corresponding to the legacy authentication protocol, wherein the legacy authentication credentials are associated with the one or more user credentials; and*

*a credential binding module in communication with the authentication proxy module and configured to associate the legacy authentication credentials with a cached Kerberos credential,*

*wherein the authentication proxy module is further configured to: (i) authenticate the user corresponding to the legacy authentication credentials using a Kerberos authentication protocol by invoking a Kerberos authentication request to a Kerberos server, and (ii) use the cached Kerberos credential received from the credential binding module to authenticate the user when the Kerberos server is temporarily unavailable;*

*and* wherein the authentication proxy module is further configured to eliminate anonymous binds by authenticating an anonymous user as a network directory services object.

[13. The apparatus of claim 10, wherein the legacy authentication credentials comprise a user name and password.]

14. [The apparatus of claim 10,] *An apparatus to provide authentication services to legacy applications, the apparatus comprising:*

*one or more legacy applications executing on an application server and configured to authenticate a user based on one or more user credentials received from a client using a legacy authentication protocol, wherein the one or more legacy applications are not configured to authenticate using a Kerberos authentication protocol;*

*an authentication proxy module executing on a computing device and configured to receive legacy authentication credentials from the one or more legacy applications corresponding to the legacy authentication protocol, wherein the legacy authentication credentials are associated with the one or more user credentials; and*

*a credential binding module in communication with the authentication proxy module and configured to associate the legacy authentication credentials with a cached Kerberos credential,*

*wherein the authentication proxy module is further configured to: (i) authenticate the user corresponding to the legacy authentication credentials using a Kerberos authentication protocol by invoking a Kerberos authentication request to a Kerberos server, and (ii) use the cached Kerberos credential received from the credential binding module to authenticate the user when the Kerberos server is temporarily unavailable;*

*and* wherein the legacy authentication credentials comprise a biometric.

[15. The apparatus of claim 10, wherein the legacy authentication protocol is selected from the group consisting of RADIUS, TACACS, ftp, LDAP, SQL and ODBC.]

[16. A method of providing authentication services to legacy applications, the method comprising:

directing from one or more legacy applications executing on an application server legacy authentication credentials corresponding to a legacy authentication protocol to a local authentication process executing on a computing device, wherein the one or more legacy applications are not configured to use a Kerberos authentication protocol to authenticate a user;

receiving the legacy authentication credentials with the local authentication process;

associating with a binding module the legacy authentication credentials with a Kerberos credential; and with the local authorization process: (i) when a Kerberos server coupled to the computing device is available, authenticating a user corresponding to the legacy authentication credentials using a Kerberos authentication protocol in response to receiving the authentication credentials by invoking a Kerberos authentication request to the Kerberos server, and (ii) using the Kerberos credential received from the binding module to authenticate the user when the Kerberos server is unavailable.]

17. [The method of claim 16, further comprising] *A method of providing authentication services to legacy applications, the method comprising:*

*directing from one or more legacy applications executing on an application server legacy authentication credentials corresponding to a legacy authentication protocol to a local authentication process executing on a computing device, wherein the one or more legacy applications are not configured to use a Kerberos authentication protocol to authenticate a user;*

*receiving the legacy authentication credentials with the local authentication process;*

*associating with a binding module the legacy authentication credentials with a Kerberos credential;*

*with the local authorization process: (i) when a Kerberos server coupled to the computing device is available, authenticating a user corresponding to the legacy authentication credentials using a Kerberos authentication protocol in response to receiving the authentication credentials by invoking a Kerberos authentication request to the Kerberos server, and (ii) using the Kerberos credential received from the binding module to authenticate the user when the Kerberos server is unavailable; and* eliminating anonymous binds by authenticating an anonymous user as a network directory services object.

[18. The method of claim 16, wherein the Kerberos credential comprises a Kerberos identity.]

[19. The method of claim 16, wherein the Kerberos credential comprises a Kerberos ticket.]

[20. The method of claim 19, wherein using the Kerberos credential received from the binding module to authenticate the user comprises decrypting the Kerberos ticket using user-submitted credentials associated with the legacy authentication credentials.]

21. [The method of claim 20, further comprising] *A method of providing authentication services to legacy applications, the method comprising:*

*directing from one or more legacy applications executing on an application server legacy authentication credentials corresponding to a legacy authentication protocol to a local authentication process executing on a computing device, wherein the one or more legacy applications are not configured to use a Kerberos authentication protocol to authenticate a user;*

*receiving the legacy authentication credentials with the local authentication process;*

*associating with a binding module the legacy authentication credentials with a Kerberos credential that comprises a Kerberos ticket;*

*with the local authorization process: (i) when a Kerberos server coupled to the computing device is available, authenticating a user corresponding to the legacy authentication credentials using a Kerberos authentication protocol in response to receiving the authentication credentials by invoking a Kerberos authentication request to the Kerberos server, and (ii) using the Kerberos credential received from the binding module to authenticate the user when the Kerberos server is unavailable; and* using the Kerberos ticket received from the binding module to authenticate the user following expiration of the Kerberos ticket, *wherein using the Kerberos credential received from the binding module to authenticate the user comprises decrypting the Kerberos ticket using user-submitted credentials associated with the legacy authentication credentials.*

[22. The method of claim 16, further comprising determining with the local authorization process when the Kerberos server is unavailable.]

[23. A computer readable storage medium comprising computer readable program code configured to execute on a processor to carry out a method to providing authentication services to legacy applications, the method comprising:

directing from one or more legacy applications on an application server legacy authentication credentials corresponding to a legacy authentication protocol to a local authentication process executing on a computing device, wherein the one or more legacy applications are not configured to use a Kerberos authentication protocol to authenticate a user;

receiving the legacy authentication credentials with the local authentication process;

associating with a binding module the legacy authentication credentials with a Kerberos credential; and with the local authorization process: (i) when a Kerberos server coupled to the computing device is available, authenticating a user corresponding to the legacy authentication credentials using a Kerberos authentication protocol in response to receiving the authentication credentials by invoking a Kerberos authentication request to the Kerberos server, and (ii) using the Kerberos credential received from the binding module to authenticate the user when the Kerberos server is unavailable.]

24. [The computer readable storage medium of claim 23, wherein the method further comprises] *A computer readable storage device comprising computer readable program code configured to execute on a processor to carry out a method to providing authentication services to legacy applications, the method comprising:*

*directing, from one or more legacy applications on an application server, legacy authentication credentials corresponding to a legacy authentication protocol, to a local authentication process executing on a computing device, wherein the one or more legacy applications are not configured to use a Kerberos authentication protocol to authenticate a user;*

*receiving the legacy authentication credentials with the local authentication process;*

*associating with a binding module the legacy authentication credentials with a Kerberos credential;*

*with the local authorization process: (i) when a Kerberos server coupled to the computing device is available, authenticating a user corresponding to the legacy authentication credentials using a Kerberos authentication protocol in response to receiving the authentication credentials by invoking a Kerberos authentication request to the Kerberos server, and (ii) using the Kerberos credential received from the binding module to authenticate the user when the Kerberos server is unavailable; and* eliminating anonymous binds by authenticating an anonymous user as a network directory services object.

*25. A system to provide authentication services to legacy applications, the system comprising:*

*an application server comprising computer hardware including at least one computer processor and executing one or more legacy applications configured to authenticate a user based on one or more user credentials received from a client using a legacy authentication*

*protocol selected from the group consisting of RADIUS, TACACS, LDAP, SQL and ODBC, wherein the one or more legacy applications are not configured to authenticate using a Kerberos authentication protocol;*

*at least one computing device comprising computer hardware, including at least one computer processor, that:*

*executes an authentication proxy module stored in computer memory, thereby causing the computer hardware to receive legacy authentication credentials from the one or more legacy applications corresponding to the legacy authentication protocol, wherein the legacy authentication credentials are associated with the one or more user credentials; and*

*executes a credential binding module stored in computer memory and in communication with the authentication proxy module, thereby causing the computer hardware to associate the legacy authentication credentials with a cached Kerberos credential;*

*and wherein execution of the authentication proxy module further causes the computer hardware to: (i) authenticate the user corresponding to the legacy authentication credentials using a Kerberos authentication protocol by invoking a Kerberos authentication request to a Kerberos server, and (ii) use the cached Kerberos credential received from the credential binding module to authenticate the user when the Kerberos server is temporarily unavailable.*

*26. The system of claim 25, wherein the legacy authentication protocol is RADIUS.*

*27. The system of claim 25, wherein the legacy authentication protocol is TACACS.*

*28. The system of claim 25, wherein the legacy authentication protocol is LDAP.*

*29. The system of claim 25, wherein the legacy authentication protocol is SQL.*

*30. The system of claim 25, wherein the legacy authentication protocol is ODBC.*

*31. An apparatus to provide authentication services to legacy applications, the apparatus comprising:*

*at least one computing device comprising computer hardware, including at least one computer processor, that:*

*executes an authentication proxy module stored in computer memory, thereby causing the computer hardware to receive, from one or more legacy applications executing on an application server, legacy authentication credentials corresponding to a legacy authentication protocol selected from the group consisting of RADIUS, TACACS, LDAP, SQL and ODBC, wherein the one or more legacy applications are not configured to use a Kerberos authentication protocol to authenticate a user; and*

*executes a credential binding module stored in computer memory and in communication with the authentication proxy module, thereby causing the computer hardware to associate the legacy authentication credentials with a Kerberos credential;*

*and wherein execution of the authentication proxy module by the computing device further causes the computer hardware to: (i) authenticate a user corresponding to the legacy authentication credentials using a Kerberos authentication protocol by invoking a Kerberos authentication request to a Kerberos server, and (ii) use the Kerberos credential received from the credential binding module to authenticate the user when the Kerberos server is temporarily unavailable.*

*32. The apparatus of claim 31, wherein the legacy authentication protocol is RADIUS.*

*33. The apparatus of claim 31, wherein the legacy authentication protocol is TACACS.*

*34. The apparatus of claim 31, wherein the legacy authentication protocol is LDAP.*

*35. The apparatus of claim 31, wherein the legacy authentication protocol is SQL.*

*36. The apparatus of claim 31, wherein the legacy authentication protocol is ODBC.*

* * * * *